United States Patent [19]
Peterson, Jr.

[11] 3,960,130
[45] June 1, 1976

[54] START AIR CONTROL SYSTEM

[75] Inventor: William A. Peterson, Jr., Royal Oak, Mich.

[73] Assignee: The Bendix Corporation, Southfield, Mich.

[22] Filed: May 28, 1974

[21] Appl. No.: 473,621

[52] U.S. Cl. .................... 123/179 A; 123/179 G; 123/124 B
[51] Int. Cl.² ........................................ F02N 17/00
[58] Field of Search......... 123/119 F, 124 A, 124 B, 123/124 R, 119 DB, 102, 179 L, 97 R, 97 B, 179 A

[56] References Cited
UNITED STATES PATENTS

| | | | |
|---|---|---|---|
| 3,043,286 | 7/1962 | Blomberg ...................... | 123/124 B |
| 3,661,131 | 5/1972 | Croft ............................ | 123/97 R X |
| 3,677,241 | 7/1972 | Gele et al. .................... | 123/119 DB |
| 3,750,632 | 8/1973 | Zechnall ....................... | 123/32 EA |
| 3,797,465 | 3/1974 | Hobo et al. ................... | 123/32 EA |
| 3,818,881 | 6/1974 | Hosho et al. .................. | 123/119 F |

Primary Examiner—Charles J. Myhre
Assistant Examiner—James D. Liles
Attorney, Agent, or Firm—James R. Ignatowski

[57] ABSTRACT

An auxiliary air control system is disclosed for automatically controlling the air flow to an internal combustion engine during the starting phase of the engine's operational cycle to facilitate clean consistant starts under both hot and cold engine conditions. The system embodies an electrically actuated control providing a predetermined air flow during the cranking and subsequent start of the engine. After the start has been achieved, the engine is permitted to accelerate to a speed determined from the engine's temperature. Thereafter the air flow is reduced in a controlled manner to the normal idle air flow. The system not only facilitates consistent starting of the engine but also substantially reduces the noxious exhaust emissions normally attendant the starting of an internal combustion engine.

22 Claims, 9 Drawing Figures

START AIR CONTROL SYSTEM

BACKGROUND OF THE INVENTION

1. Field of the Invention

This invention is directed to air control systems for an internal combustion engine and in particular the invention is directed to a start air control system controlling the air flow to the engine to facilitate consistent clean starts having reduced emission of noxious exhaust gases.

2. Prior Art

Fundamental to starting an internal combustion engine at either high or low ambient temperatures down to minus 30°F is the provision of an ample air-fuel flow during the cranking of the engine and for a short period of time after the initial start to allow the engine to come up to a self-sustaining running speed in the shortest possible time. The air-fuel flow required during this initial phase of the start cycle for quick clean starts is substantially greater than that provided by the fast idle control normally associated with internal combustion engines. The fast idle control only functions to control the curb idle speed of the engine once it has been started and reaches a self-sustaining speed. In order to consistently achieve successful clean starts particularly at low temperatures, a sufficient air-fuel mixture must be supplied during the cranking period to permit the engine to accelerate from the cranking speed to an initial self-sustaining speed in the shortest possible time. Secondly, the engine should be operated at a substantially higher speed than the fast idle speed to purge the intake manifold of the residual starting fuel condensed in the cold intake manifold during cranking, a limit for the substantially higher start speed in the transition between start and idle, and a relatively smooth transition from the substantially higher start speed to the idle speed after the system has been purged to prevent stalling. The limit on the initial start speed during the transition from start to idle is a safety precaution to minimize damage normally attendant high speed operation of a cold engine when the lubricant is relatively viscous and the distribution incomplete.

The prior cold start air for internal combustion engines has been primarily directed to provide the required rich air-fuel mixture during the cranking, initial start, and fast idle warm-up cycle, and has left the requirement for providing the required air-fuel quantity to the operator. Operator manuals for automative vehicles normally contain cold start instructions which include in addition to the proceedure for setting the automatic choke and fast idle accessories, a statement to the effect that the accelerator pedal should be depressed about half-way down and held there until the engine has been successfully started. This proceedure is intended to provide the required quantity of rich air-fuel mixture necessary to start the engine and permit the engine to reach a self-sustaining speed. Admittedly, this proceedure works but is froth with variables which vary from operator to operator as well as from engine to engine. Therefore, successful starting of a cold engine is dependent upon the skill of the operator and can in many instances be damaging to the engine.

The invention is directed to a start air system for internal combustion engines which controls the quantity of air during the cranking and initial start phase of a cold engine, thereby removing the operator variables and substantially increasing the consistency and cleanliness of a successful start. Further because the speed of the engine is controlled between the initial start and idle, the engine is always properly purged of residual starting fuel and excessive wear and damage to the engine due to high speed operation under cold conditions minimized. The consistency and cleanliness of the start provided by the disclosed invention is particularly important in view of the existing and future emission standards being imposed on automotive and commercial vehicles, and especially for future vehicles equipped with thermal reactors.

SUMMARY OF THE INVENTION

The invention is a start air system controlling the quantity of air being supplied to an internal combustion engine during the cranking and initial high speed operation subsequent to a successful start. The system is in addition to the cold start fuel enrichment and fast idle accessories normally associated with internal combustion engines and provides an ample air supply sufficient to successfully start a hot or cold engine. After the engine has been started, the system allows the engine to accelerate to a speed determined by the temperature of the engine. Then after the engine has reached the temperature dependent speed and the engine's air intake manifold purged of residual starting fuel the start air system reduces the air flow to that determined by the engine's conventional idle control at a predetermined rate to prevent stalling of the engine by a too rapid deceleration.

The basic system comprises a start air actuator activated by the ignition switch for providing a predetermined air flow to the engine. The actuator may partially open the throttle of the engine's primary operator-actuated air delivery system, open secondary throttles, or provide the required air flow through an auxiliary air flow passage or duct bypassing the throttle in the primary delivery system, a temperature controlled reference speed signal generator generating a signal indicative of the initial speed the engine should reach after starting in order to completely purge the air in fuel delivery systems and be self-sustaining, a comparator comparing the reference speed signal with a signal indicative of the engine's actual speed for deactivating the start air actuator when the actual engine speed equals or exceeds the reference speed signal and a deceleration means for reducing the starting air flow to the engine from its initial flow to that determined by the fast idle control at a predetermined rate.

The objective of the invention is an automatic start air system providing consistent, high quality starting of an internal combustion engine. Another objective of the invention is a start air system substantially reducing the emission of noxious exhaust gases during engine starting and compatible with thermal reactors to be used on future vehicles. A further object of the invention is a system for providing a controlled increased cold start air flow to the engine during the cranking and initial starting of the engine to facilitate the starting and acceleration of the engine to a predetermined speed. Another objective of the invention is a control mechanism providing an increased air flow to the engine during the cranking and initial acceleration to a predetermined speed which is a function of the engine's temperature. Another objective of the invention is a start air system which in addition to facilitating the cold start and the acceleration of the engine to the temperature dependent speed automatically reduces the air flow to the engine in a predetermined manner to an air flow indicative of the engine's fast idle air flow rate to prevent stalling. A final objective of the invention is a cold start system adaptable to both carburetor and electronic fuel injection equipped internal combustion engines.

The advantages of the system are (1) improved start reliability independent of operator skill; (2) reduction of noxious exhaust emissions; (3) a controlled maximum speed after start to purge the residual starting fuel and protect the engine from accelerating to excessive speeds after starting; and (4) a controlled return to idle speed after starting preventing stalling of the engine after having once been started.

DETAILED DESCRIPTION OF THE PREFERRED EMBODIMENT

Figure 1:
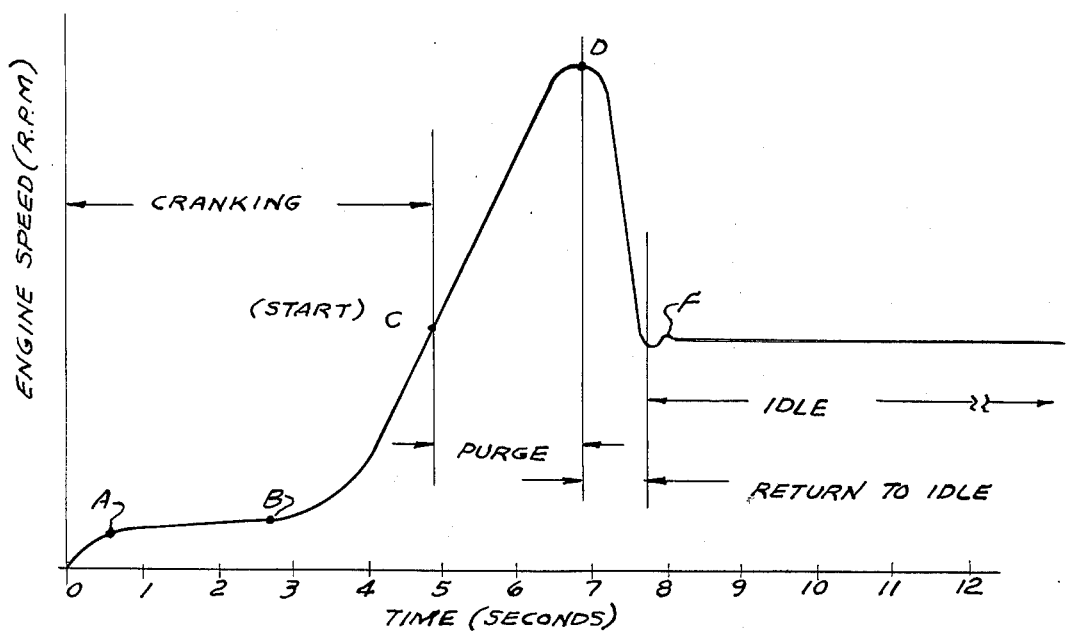
FIG. 1 is a graph showing the engine speed as a function of time for a typical low temperature start attempt.

The starting cycle of a typical internal combustion engine starting at −21°F is basically illustrated in FIG. 1 which shows the engine speed as a function of time. The engine starter is engaged at time 0 and after a short period of time, point A on the curve, the engine starts to rotate at a speed predetermined by the speed of the starter drive only. After a few revolutions of the engine indicated as point B, sufficient air and fuel air reach the cylinders and the power generated by the internal combustion adds to the power provided by the starter and the speed of the engine starts to increase rapidly. Shortly thereafter indicated by point C, the speed of the engine has increased to a value sufficient to sustain the operation of the engine at that temperature and the cranking by the starter may be terminated. However, if the air-fuel flow at this point were cut back to the flow determined by the fast idle control, residual fuel initially condensed in the intake manifold during the cranking interval from A to C would revaporize producing an excessively rich fuel-air mixture which may cause the engine to miss and perhaps even stall. In either case the excessive fuel contaminates or fouls the spark plugs resulting in a "dirty" start and the emission of noxious exhaust gases. To purge the engine of the residual fuel, the engine should be allowed to accelerate to a speed significantly higher than the desired idle speed by a continued high volume of air and fuel. Since the residual fuel in the intake manifold is a relatively fixed quantity dependent upon the initial temperature of the engine and other engine parameters the dissipation of the residual fuel in a large quantity of air will have a lesser enrichment effect than dissipating the same amount of residual fuel in a smaller quantity of air. Further, the engine operating at the higher speed is less susceptible to missing and the probability of stalling during the purging process greatly reduced. Both of these factors tend to reduce the emission of noxious exhaust gas and reduce the saturation and contamination of thermal reactors. After the majority of the residual fuel is purged from the intake manifold, indicated by point D, the engine can be returned to its normal idle speed indicated by point F. It is to be noted the purge interval from C to D is dependent upon the quantity of residual fuel condensed in the intake manifold which is in an inverse function of the manifold temperature. Therefore, the quantity of air required to purge the intake manifold increases at lower temperatures. The engine for practical purposes may be considered as a constant volume pump, therefore, the quantity of air flow is dependent on the average pumping speed of the engine times the time. Since the engine is accelerating during the purging period, the time required to purge the engine may also be computed as a function of the engine speed. It is recognized that the above deduction is relatively simplistic and other factors, such as the rate of vaporization of the fuel as a function of temperature, and variations in the start time C will vary from engine to engine as well as from start to start. However, these factors can be compensated for in the computation of the time D which is indicative of the maximum purge speed. Experiments conducted thus far have demonstrated that a clean start can be consistently accomplished when the basic principles discussed above are embodied in the system illustrated in FIG. 2.

Figure 2:
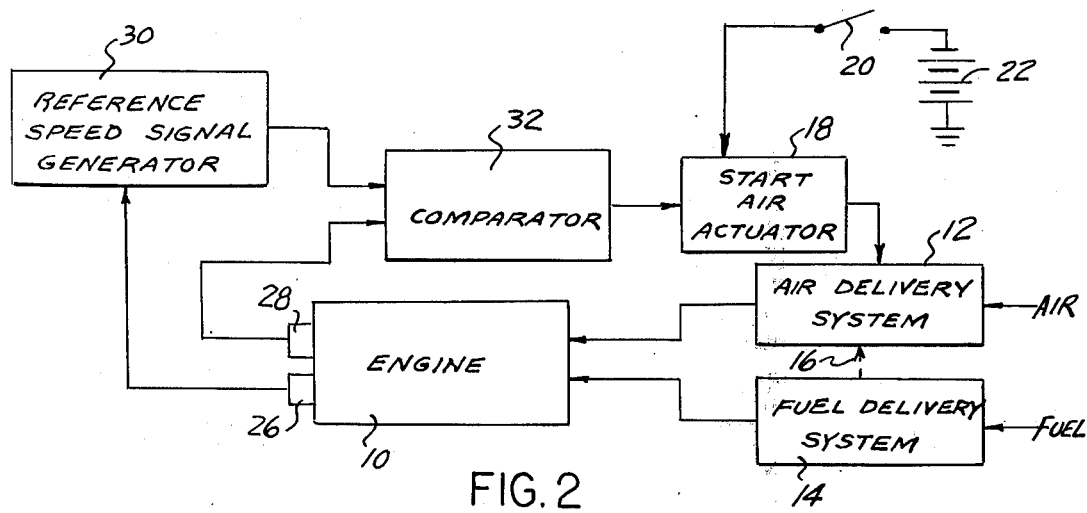
FIG. 2 is a block diagram showing the basic elements of the start air system.

FIG. 2 is a block diagram of the basic cold start system. An internal combustion engine 10 receives air and fuel from external sources indicated by air delivery system 12 and fuel delivery system 14. The air and fuel delivery systems may be integrated as in a conventional carburetor equipped engine as indicated by dashed line 16 or may be separate entities as in an electronic fuel injection equipped engine. Whether the air and fuel delivery systems are separate entities or are integrated using any of the methods well known in the art, are immaterial to the invention, as long as they provide the required fuel and air in the proper ratio for the operation of the engine. For the purposes of the following discussions, it is assumed that the air and fuel delivery systems are capable of providing the engine with the proper air and fuel for efficient operation including an enriched air-fuel mixture for cold starting and subsequent warm-up period. Numerous types of systems with these capabilities are well known and further discussion is unwarranted for an understanding of the invention.

At the initiation of a start attempt, a start air actuator 18 responding to a signal indicative of a start, such as the closing of the ignition switch 20 connected to an electrical power source associated with engine indicated as battery 22. The start air actuator 18 in response to the start signal actuates the air delivery system to deliver a predetermined quantity of air to the engine 10. The start air actuator 18 may set the position of the primary or secondary throttle (not shown) controlling the air flow in the air delivery system or may actuate an auxiliary air delivery system by-passing the throttle. At this point, the method used is immaterial. The fuel delivery system responding to the start air flow delivers the required fuel to effect the starting of the engine. Attached to the engine 10 are a temperature sensor 26 generating a signal indicative of the engine's temperature, and a speed sensor 28 generating a signal indicative of the engine's actual speed. It is acknowledged that these signals may also be derived for the electronic control unit in electrically controlled fuel injection equipped engines and separate sensors may not be required. A reference speed signal generator 30 responds to the temperature signal and generates a reference maximum speed signal indicative of the engine speed that the engine should reach to effectively purge the residual gas from the intake manifold. The reference speed signal along with the actual engine speed signal from speed sensor 28 are transmitted to a comparator 32 which compress the two signals. When the actual speed signal is equal to or greater than the reference speed signal the comparator 32 generates a termination signal which de-energizes the start air actuator 18 and returns the air flow to the engine back to the air delivery system 12 and its attendant accessories in a predetermined manner.

Figure 3:
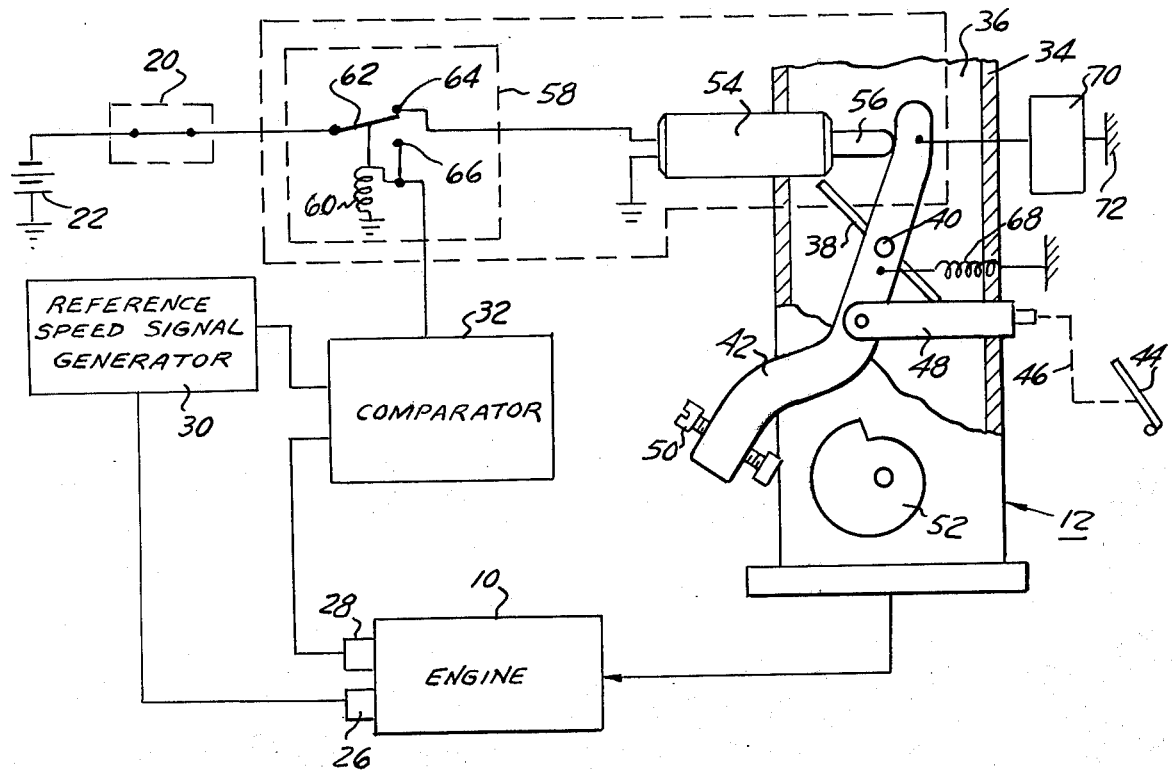
FIG. 3 is an illustration of the start air control system with a solenoid actuating the throttle in the primary air delivery system.

A specific embodiment of the start air actuator controlling the throttle position in a conventional air delivery system is illustrated in FIG. 3. The reference numerals indicating the same elements shown in FIG. 2 are the same. Further the fuel delivery system is implied but omitted to simplify the drawing. A partial cross section of the throttle controlled air delivery system 12 is shown. The air delivery system has a throttle body 34 forming a primary air passage 36 ducting air from an external filtered source to the engine 10. In a conventional internal combustion engine the air enters the air delivery system after passing through an air filter (not shown) to remove dust and other contaminant particles from the air before passing to the engine. The use of a filter in connection with the air delivery system in this and subsequently discussed embodiments will be understood.

The air flow through the passage 36 is controlled by a rotatable throttle 38 fixedly attached to a pivot shaft 40. The pivot shaft 40 is fixedly attached and rotates with a pivot arm 42. The pivot arm 42 is actuated by the operator's accelerator pedal 44 by means of mechanical linkages symbolically illustrated as dashed line 46 and actuator 48. At one end of the pivot arm 42 is a cam follower illustrated in the form of an idle air adjustment screw 50 which engages the surface of a fast idle cam 52 and controls the position of the throttle 38 when the throttle pedal 44 is in the curb idle position. The operation of the fast idle cam and associated positioning mechanisms are well known in the art and need not be discussed for the purposes of this invention.

An electrically activated electromechanical device illustrated as solenoid 54 having a linearly activated armature shaft 56 is disposed to engage the pivot arm 42 at the end opposite the idle screw and place the throttle 38 in the start position when the solenoid is actuated and the armature shaft 56 is extended as shown. The shaft 56 may engage the pivot arm 42 directly as shown, or through appropriate mechanical linkages as may be devised by any person skilled in the art. Power is applied to the solenoid 54 from the engine's electrical power source such as battery 22 through the ignition switch 20 and a normally closed latching relay 58. Closing the ignition switch 20 energizes the solenoid 54 extending shaft 56 thereby rotating pivot arm 42 and opening throttle 38 to provide the desired start air flow. After the engine starts and the speed sensor 28 generates a signal indicative of a speed equal to or greater than the reference speed signal generated by the reference speed generator 30, the comparator 32 generates a signal applied to the latching coil 60 of the relay 58. The magnetic field produced by the coil 60 causes the contact 62 to switch from post 64 to post 66 de-energizing the solenoid 54 and energizing the coil 60 directly from the electrical power source as long as the ignition switch remains closed. With the solenoid de-energized, a biasing means illustrated as spring 68 urges the pivot arm 42 to rotate in a direction (counter-clockwise in the illustration) to cause cam follower 50 to engage cam 52 and the other end of the pivot arm 42 to urge the armature shaft 56 back into the solenoid 54. It is recognized that in some solenoids the armature shaft 56 is spring loaded and will retract automatically when the solenoid is deactivated. The dash pot 70 attached between arm 42 and a stationary member 72 controls the rate at which spring 68 rotates the arm 42 to engage the cam follower 50 with the cam 52. The dash pot 70 by controlling the rotational rate of arm 42 controls the rate at which throttle 38 is closed preventing a sudden closing of the throttle when the solenoid is deactivated and prevents stalling of the engine by a sudden reduction in air flow. It is not necessary that dash pot 70 be connected directly to the arm 42 but may be connected to an element in a connecting linkage associated with armature shaft 56 as shown in FIG. 4 so that once the shaft 56 is retracted into the solenoid, the dash pot 70 is no longer associated with the movement of arm 42 and the throttle functions in a normal manner independent of the dash pot.

Figure 4:
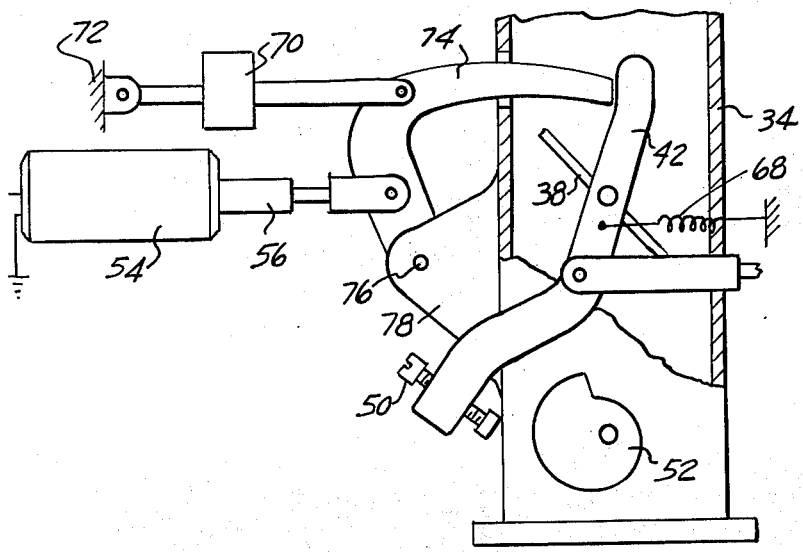
FIG. 4 is an alternate embodiment of the system shown in FIG. 3.

In FIG. 4 the extendable shaft 56 of solenoid 54 rotates actuator 74 rotatably pivoted at one end about a shaft 76 attached to an ear 78 fixedly attached to a stationary member such as the throttle body 34. When the solenoid 54 is deactivated, the bias spring 68 urges the pivot arm 42 to rotate and urges actuator arm 74 to push armature shaft back into the solenoid. The dash pot 70 is connected between the actuator arm 74 and a stationary member 72 by appropriate linkages and impedes the rotational movement of the throttle 38 to the closed position in response to the biasing force of spring 68.

Figure 5:
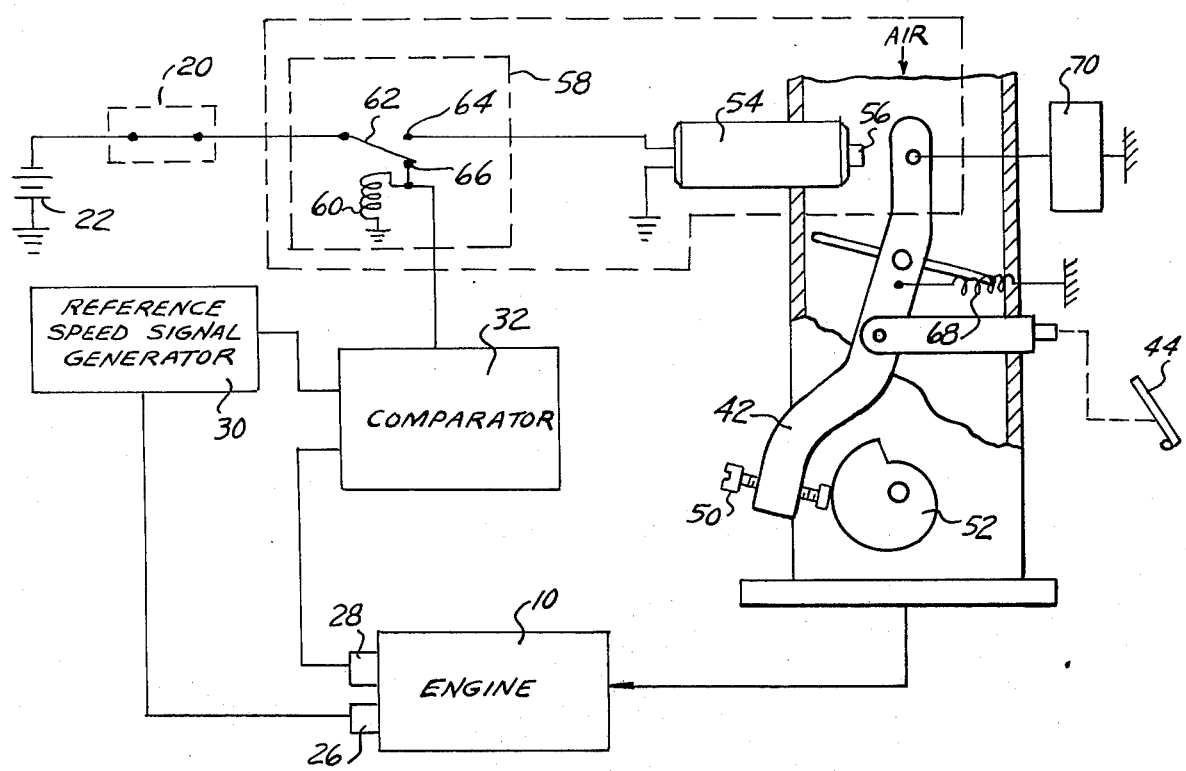
FIG. 5 is an illustration of the system shown in FIG. 3 with the start air control system deactivated.

FIG. 5 illustrates the position of the elements shown in FIG. 3 with the solenoid deactivated and the armature shaft 56 in the retracted position after the relay 58 has been actuated by a signal generated by the comparator.

As shown in FIG. 5 the contact 62 of the relay 58 is in contact with post 66 and applies battery power directly to the coil 60. The coil 60 holds the relay in this position as long as the ignition switch 20 remains closed. The solenoid is no longer in electrical connection with the electrical power supply 22 and is deactivated. Arm 42 under the force of spring 68 rotates in counter-clockwise direction and cam follower 50 is engaged with fast idle cam 52 closing the throttle to the position determined by the fast idle control of the air delivery system. In this condition with the shaft 56 withdrawn, the air delivery to the engine is controlled by either the fast idle cam when the throttle pedal is in the idle position and by the throttle pedal in any other position.

One skilled in the art will quickly recognize that the same or mechanically equivalent approach may be used to control the air flow through a throttle bypass passage when the air delivery system includes such a throttle bypass auxiliary air delivery system. Once one understands the principle of operation, a myriad of mechanical embodiments immediately become obvious.

Figure 6:
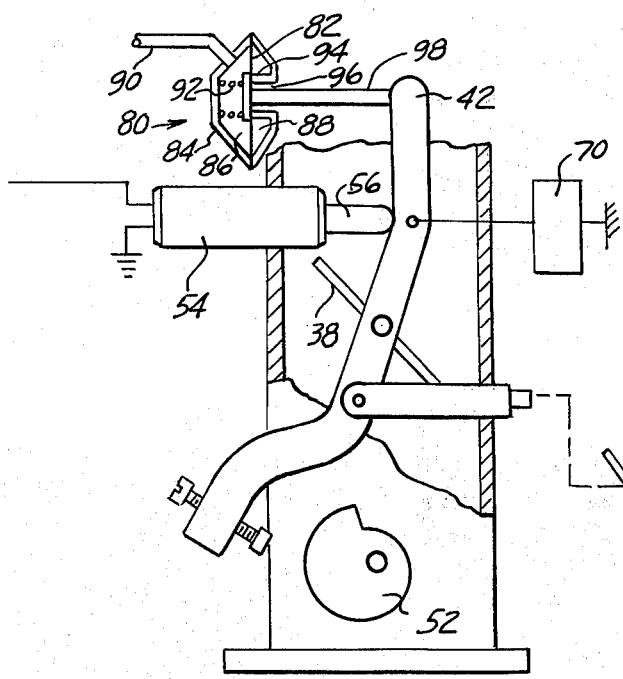
FIG. 6 is an alternate embodiment of the start air control system having a vacuum motor initially controlling the start air flow.

One of such embodiments shown in FIG. 6 uses the spring force of a vacuum 80 motor to initially set the throttle to the start air position prior to a start attempt. With the exception of the vacuum motor, all the elements shown in FIG. 6 are the same as shown in FIG. 2. The vacuum motor 80 has a flexible diaphragm 82 dividing a vacuum motor housing 84 into two chambers 86 and 88. Chamber 86 is vented by means of a hollow member such as tube 90 to the air pressure in the intake manifold of the engine. Chamber 88 is vented to atmospheric pressure. Chamber 86 has a resilient member such as spring 92 urging the flexible diaphragm 82 away from the opposite wall of the chamber. The movement of the diaphragm 82 by the force generated by spring 92 is limited by a stop 94 formed about an aperture 96 in the part of the housing enclosing chamber 88. Attached to the diaphragm 82 and moveable therewith is an actuator shaft 98 extending through the aperture 96 and engaging the pivot arm 42. With the flexible diaphragm against the stop 94 when the engine is stopped and there is no vacuum in the intake manifold the shaft 98 urged by spring 92 engages the pivot arm 42 and sets the position of throttle 38. When the ignition is turned on, solenoid 54 is activated and armature shaft 56 extends and assists vacuum motor spring 92 to hold pivot arm 42 in the start air position. During cranking and prior to the engine starting both the vacuum motor 80 and the solenoid cooperate to hold the throttle in the open position. After the engine starts, a vacuum develops in the intake manifold and by means of tube 90 is communicated to chamber 86 in the vacuum motor. The flexible diaphragm 82 under the influence of atmospheric air pressure in chamber 88 moves against the force of spring 92 and retracts rod 98 from engagement with arm 42. Now pivot arm 42 is only held in position by the solenoid shaft 55 which retracts when the solenoid is deactivated as previously described with reference to FIGS. 2 and 4. The advantage of this system is that the solenoid is only used to hold the throttle in the start position, which requires substantially less power than that required to open the throttle from the closed position as discussed relative to FIG. 2.

Figure 7:
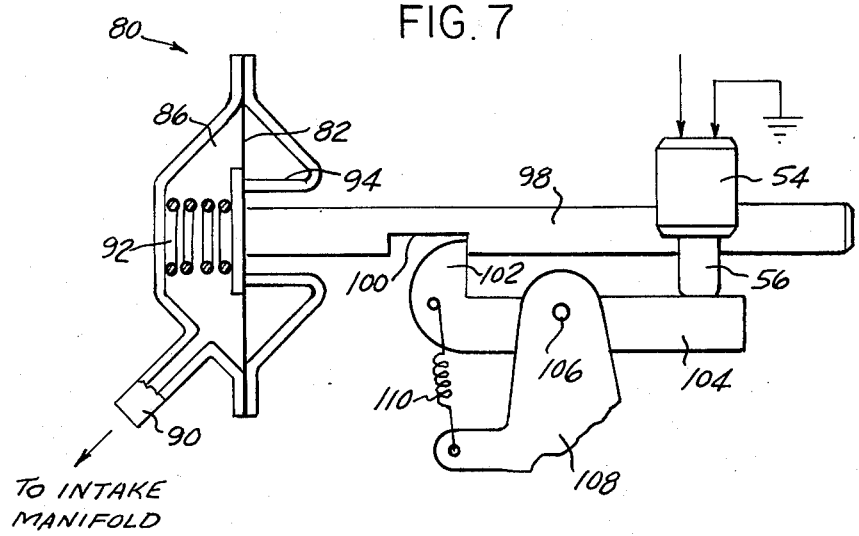
FIG. 7 is an alternate embodiment of the system shown in FIG. 6.

Alternatively, the solenoid may be used to lock the vacuum motor shaft in the extended position as shown in FIG. 7. FIG. 7 only shows the interrelationship between the vacuum motor and the solenoid while the remainder of the system is as shown in FIG. 3. The vacuum motor 80 as described relative to FIG. 7 has the shaft 98 in the extended position with the flexible diaphragm 82 being urged by spring 92 against the stop 94. The shaft 98 has a notch 100 engaged by a dog 102 on lever 104 pivoted about a shaft 106. The shaft 106 is supported from a stationary member 108 which may be the throttle body or any other stationary member associated with the engine. The dog 102 is biased away from the notch 100 by a resilient means such as a spring 110. When the ignition is turned on, the solenoid 54 is actuated and the armature shaft 56 extends rotating lever 104 against the force of spring 110 and dog 102 engages notch 100 in shaft 98. In this condition the dog 102 prevents the shaft 98 from being retracted even when a vacuum exists in chamber 86. Dog 102 remains engaged with notch 100 until the solenoid 54 is de-energized. De-energizing the solenoid allows spring 110 to retract the dog 102 from notch 110 and shaft 98 will retract due to atmospheric pressure on the flexible diaphragm 82. It would be obvious to a person skilled in the art that the force of the resilient spring and that of the armature shaft could be reversed and the force of the solenoid be used to unlatch the shaft 98.

Figure 8:
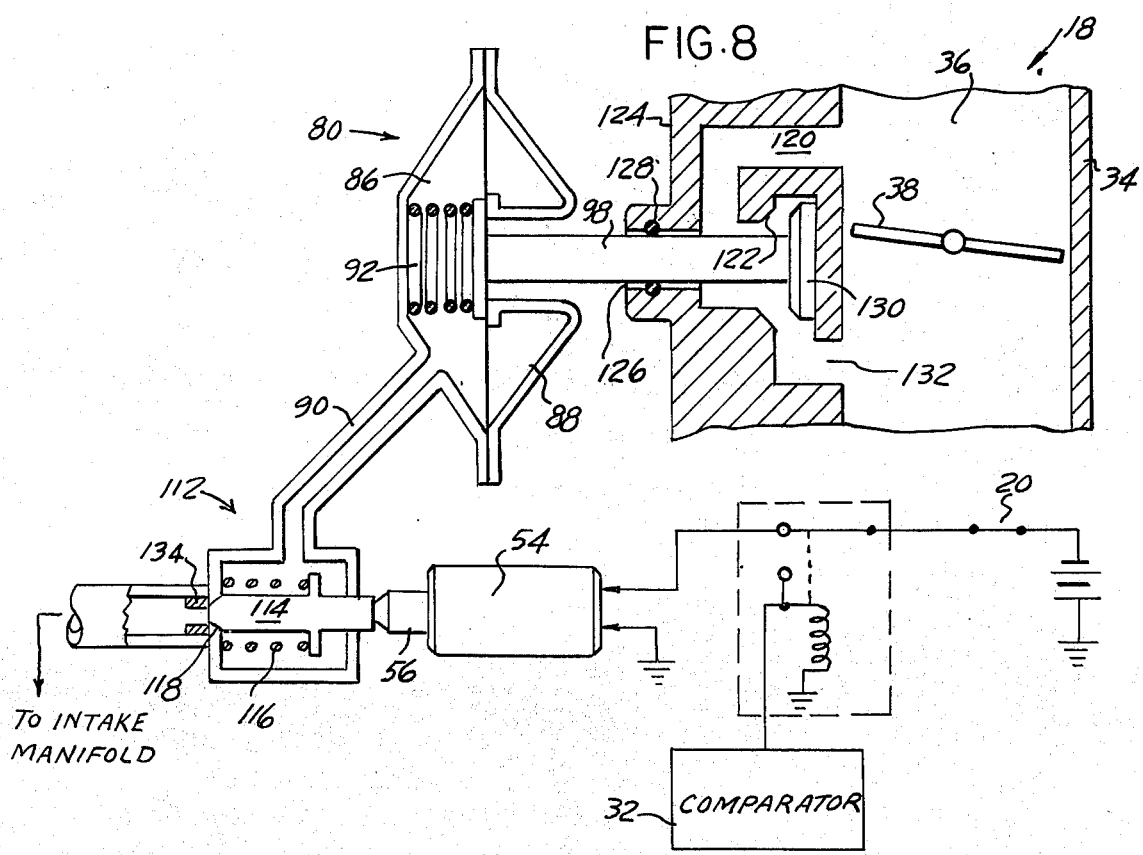
FIG. 8 is an illustration showing the solenoid valve controlling the operation of the vacuum motor.

FIG. 8 shows still another alternative method in which the solenoid 54 controls the position of a valve 112 in the vacuum tube 90 between the intake manifold and the vacuum motor 80. The solenoid 54 is energized when the ignition switch 20 is placed in the "ON" position extending armature shaft 56 outwardly. The armature shaft 56 engages a pintle 114 and urges it forward against the force of a resilient member such as spring 116 and comes to stop against valve seat 118. With the pintle 114 seated against the seat 118, the vacuum generated in the intake manifold is prevented from evacuating chamber 86 in the vacuum motor 80 and the shaft 98 remains in its extended position. Deactivation of solenoid 54 by signal generated by the comparator 32 permits the spring 116 to unseat the pintle 114 from seat 118 permitting the vacuum in the intake manifold to evacuate chamber 86. Atmospheric pressure in chamber 88 then moves flexible diaphragm 82 against the force of the spring 92 retracting the shaft 98. The motion of shaft 98 in FIG. 8 is used to control the start air flow in an auxiliary air passage bypassing the throttle 38 in the primary air delivery system 12.

The start air is derived from a clean atmospheric pressure air source such as from the air intake air filter or as shown from the primary air delivery system by means of an air entrance passage 120 opening into the primary air passage 36 at a point upstream of the throttle 38. Entrance passage 120 is in the form of a "U" having a valve seat 122 at the terminal end. A valve housing 124 has an aperture 126 adapted to receive the actuator shaft 98 along one leg of the "U"-shaped passage 120. A seal 128 is provided to prevent air leakage. A valve member 130 is fixedly attached to the end of the actuator shaft 98 and moves therewith so that retracting of the actuator shaft by the vacuum motor 80 will cause valve member 130 to seat against the valve seat 122 blocking passage 120. The start air flow is returned to the primary air passage 36 downstream of the throttle 38 by means of exit passage 132. The rate at which the actuator 98 moves valve member 130 to close passage 120 may be controlled by restriction 134 associated with valve 112 as shown or a restriction in vacuum tube 90 controlling the air flow from vacuum motor chamber 86 into the intake manifold.

In operation, prior to starting the engine, valve 112 is open and chamber 86 is at atmospheric pressure, therefore, the force of spring 92 extends the actuator shaft 98 unseating valve member 130 from valve seat 122 and start air from upstream of the throttle 38 flows through passages 120 and 132 to a point downstream of the throttle. When the ignition switch is closed indicating a start attempt, solenoid 54 is energized and valve 112 is closed keeping chamber 86 at atmospheric pressure and shaft 98 extended. After the engine reaches the predetermined speed, the solenoid is deactivated and valve 112 opens and the vacuum in the intake manifold causes air to flow from chamber 86. The restriction 134 controls the rate at which the chamber 86 is evacuated and therefore the rate at which shaft 98 retracts valve member 130 to close passage 120. After a predetermined time, valve member 130 seats against valve seat 122 and the start air is terminated.

Figure 9:
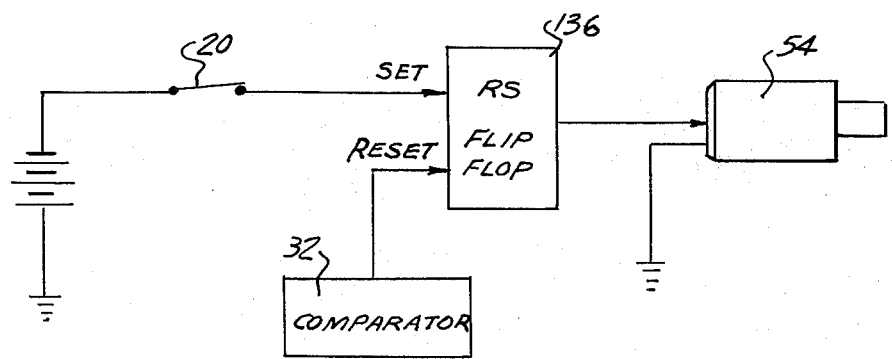
FIG. 9 is a circuit diagram showing a solid-state switch controlling the actuation of the solenoid.

Although the comparator 32 is illustrated as actuating a latching relay, such as relay 58, it is well within the perview of one skilled in the art to substitute solid-state control devices to perform the same function. FIG. 9 shows a portion of the start air servo embodying a bi-stable solidstate flip-flop 136 performing the same function as relay 58. A set signal received by closing the ignition switch 20 places the flip-flop 136 in a first state energizing the solenoid 54. A reset signal generated by the comparator 32 when the actual engine speed equals or exceeds the predetermined speed causes the flip-flop to change state and de-energizes the solenoid. The flip-flop 136 is now locked in the second state until the ignition switch 20 is opened terminating power to the flip-flop preventing re-energization of the solenoid after the engine has been once started and accelerated to the predetermined speed. Although various methods have been disclosed for implementing the invention, the scope of the invention is not limited by the embodiments illustrated. A person skilled in the art will immediately recognize that changes can be made to the illustrated embodiment without departing from the spirit of the invention. For instance, actuation of the solenoid may be initiated by the starter relay rather than the ignition switch or a stepper motor may replace the solenoid or the latching relay or flip-flop may be replaced with alternate solid-state switching circuits. These alternate embodiments are contemplated to be within the scope of the invention.

What is claimed is:

1. A start air control system for an internal combustion engine having an air delivery system including a throttle controlled air intake manifold and cranking means for starting the engine comprising:
   means sensing engine operating conditions including engine speed and engine temperature for generating a start termination signal when engine speed exceeds a reference speed having a value determined by engine temperature; and
   start air control means for generating an output signal operative to provide a predetermined engine input air flow during engine starting, said start air control means having a first state generating said output signal and switched to a second state terminating said output signal in response to said termination signal.

2. The system of claim 1 further including deceleration means for controlling the rate at which said output signal is terminated when said start air control means switches from said first state to said second state.

3. The system of claim 2 wherein said termination signal generation means comprises:
   means responsive to engine temperature for generating an engine speed reference signal indicative of a maximum engine speed determined by the engine's temperature;
   speed sensor means for generating an actual speed signal indicative of actual engine speed; and
   comparator means comparing said actual speed signal with said reference signal for generating said termination signal when the actual speed signal is greater than said reference signal.

4. The system of claim 3 wherein said means for generating a reference speed signal includes:
   sensor means generating a signal indicative of engine temperature; and
   a reference speed signal generating circuit receiving said temperature signal and generating said reference speed signal having a value inversely proportional to engine temperature.

5. The system of claim 4 wherein said reference speed signal generating circuit generates a reference signal indicative of an engine speed having a value sufficient to purge the intake manifold of the residual fuel condensed therein during engine cranking.

6. The system of claim 2 wherein said start air control system further includes a normally closed throttle valve movable between the closed position and a full open position for controlling the air engine flow, said start air flow control means comprises:
   actuator means for controlling the position of said throttle value, said actuator means having a first active state partially opening the throttle valve from the closed position to a predetermined start position and a deactive state; and
   means for controlling the state of said actuator means said means for controlling activating said actuator means to said first state during the cranking and deactivating said actuator means permitting said throttle valve to return to its normally closed position in response to said termination signal.

7. The system of claim 6 wherein said deceleration means is a dashpot controlling the rate at which said throttle valve closes from said start position to said closed position when said actuator is deactivated.

8. The system of claim 6 wherein said actuator means includes:
   an electrically actuated solenoid having an armature, said armature having a first position in the inactive state and linearly displaced to a second position in the activated state; and
   means mechanically linking the linear displacement of said armature to said throttle valve for opening said throttle valve to said start position when said solenoid is in the active state; and
   wherein said means for controlling is a bistable electrical switch having an initial state applying electrical power to said solenoid, and switchable to a second state in response to said termination signal terminating electrical power to the solenoid.

9. The system of claim 6 wherein said actuator means is a vacuum motor having a vacuum chamber and an actuator movable in response to the pressure in the vacuum chamber, said actuator having a first position when the pressure in the vacuum chamber is above a first predetermined value and a second position when the pressure in the vacuum chamber is below a second predetermined value; and
   means mechanically linking the vacuum motor actuator to the throttle valve in the first position to open said throttle valve to said start position; and
   wherein said means for controlling said actuator means comprises:
   an electrically actuated solenoid valve controlling the pressure in said vacuum chamber above said first pressure in the actuated state; and
   a bistable electrical switch having an initial state supplying electrical power to actuate said solenoid valve and switchable to a second state in response to said termination signal terminating the delivery of electrical power to deactuate said solenoid.

10. The system of claim 2 wherein said start air control system further includes a normally closed throttle valve movable between a closed position and a full open position for controlling air flow to the engine said start air flow control means comprises:
   a vacuum motor having a vacuum chamber and an actuator movable in response to the pressure in the vacuum chamber, said actuator having a first position when the pressure in the vacuum chamber is above a first predetermined value and a second position when the pressure in the vacuum chamber is below a second predetermined value;
   means attached to the vacuum motor actuator for opening the throttle valve to the start position when said armature is in said first position;
   an electrically actuated solenoid having an armature linearly displaced in the actuated state;
   means mechanically linking the the armature to the throttle valve to cooperate with the vacuum motor to hold the throttle valve in the start position when the solenoid is in the actuated state; and
   a bistable switch having a first state applying electrical power to actuate said solenoid and switchable to a second state in response to said termination signal to terminate electrical power to said solenoid.

11. The system of claim 2 wherein the start air control system includes a throttle having a throttle bypass air delivery passage said start air control means controls the air flow through the throttle bypass air delivery passage to provide an increased engine air flow during engine starting.

12. In combination with an internal combustion engine having an air delivery system providing the air required for the operation of the engine and a cranking system for starting the engine, a cold start air control system to facilitate the starting of the engine comprising:
   a temperature sensor generating a signal indicative of the engine's temperature;
   reference signal generating means receiving said temperature signal for generating a temperature dependent reference speed signal;
   a speed sensor generating a signal indicative of the actual speed of the engine;
   comparator means receiving said reference speed signal and said actual speed signal for generating a termination signal when the actual speed signal is indicative of an engine speed greater than the speed indicated by the reference speed signal; and
   start air control means controlling the air flow through the engine's air delivery system during starting of the engine, said start air control means having a first start providing a predetermined increased air flow through the air delivery system during the cranking period and operative to remain in said first state until switched to a second state terminating said increased air flow in response to said termination signal.

13. The combination of claim 12 further including deceleration means for controlling the rate at which the air flow changes when said start air control means switches from said first state to said second state.

14. The combination of claim 13 wherein said air delivery system includes a throttle controlled air intake system having a normally closed throttle valve movable between the closed position and a full open position, said start air control means comprises:

actuator means for opening said throttle valve from the closed position to a start position intermediate said closed position and said full open position;
   switch means for controlling the actuation of said actuator means to open the throttle valve to said start position during cranking and to deactivate said actuator means permitting said throttle valve to return to its normally closed position in response to said termination signal.

15. The combination of claim 14 wherein said actuator means is an electrically actuated solenoid.

16. The combination of claim 14 wherein said actuator means is a vacuum motor controlled by an electrically actuated solenoid valve.

17. The combination of claim 13 wherein said air delivery system includes a throttle bypass air passage, said start air control means controls the air flow through said throttle bypass air passage.

18. A method for increasing the starting capability of an internal combustion engine having a primary air delivery system including a throttle controlled air intake manifold and an electrically energized starter for cranking the engine to effect a start comprising the steps of:
   generating a start signal indicative of a start attempt when the starter is energized;
   actuating a start air delivery means in response to said start signal to cause an increased air flow in the engine's air intake manifold;
   generating a reference speed signal inversely proportional to the engine's temperature indicative of desired start speed;
   generating an actual speed signal indicative of the engine's actual speed;
   comparing said actual speed signal to said reference speed signal to generate a termination signal when the engine's actual speed is greater than said desired start speed; and
   terminating the actuation of said start air delivery means in response to said termination signal.

19. The method of claim 18 wherein said step of actuating comprises the step of energizing an actuator rotating the throttle in the primary air delivery system to a predetermined start position.

20. The method of claim 18 wherein said step of actuating comprises the step of opening an auxiliary air passage bypassing the throttle in the primary air delivery system.

21. The method of claim 18 further includes controlling the rate at which said start air delivery means decreases the air flow in the engine's intake manifold after said actuation is terminated.

22. An internal combustion engine system having an auxiliary start air control comprising:
   an internal combustion engine having an operator controlled input air delivery system and cranking means for starting the engine;
   means sensing the operating conditions of said engine, including engine speed and engine temperature for generating a start termination signal when the engine speed exceeds a reference speed having a value determined the engine temperature; and
   start air control means for controlling the air flow through said input air delivery system during the starting of said engine, said start air control means having a first state providing a predetermined increased air flow through said air delivery system during the cranking period of said engine and operative to remain in said first state until switched to a second state in response to said termination signal terminating said increased air flow.

* * * * *

UNITED STATES PATENT OFFICE
CERTIFICATE OF CORRECTION

PATENT NO. : 3,960,130
DATED : June 1, 1976
INVENTOR(S) : William A. Peterson, Jr.

It is certified that error appears in the above-identified patent and that said Letters Patent are hereby corrected as shown below:

Col. 7, line 44, delete "55" and add "56".

Col. 8, line 6, delete "110", second occurrence, and add -- 100 --.

Col. 10, line 21, delete "value" and add "valve".

Col. 11, line 19, delete first occurrence "the".

Col. 11, line 54, delete "start" and insert "state".

Signed and Sealed this

Second Day of November 1976

[SEAL]

Attest:

RUTH C. MASON
Attesting Officer

C. MARSHALL DANN
Commissioner of Patents and Trademarks